UNITED STATES PATENT OFFICE.

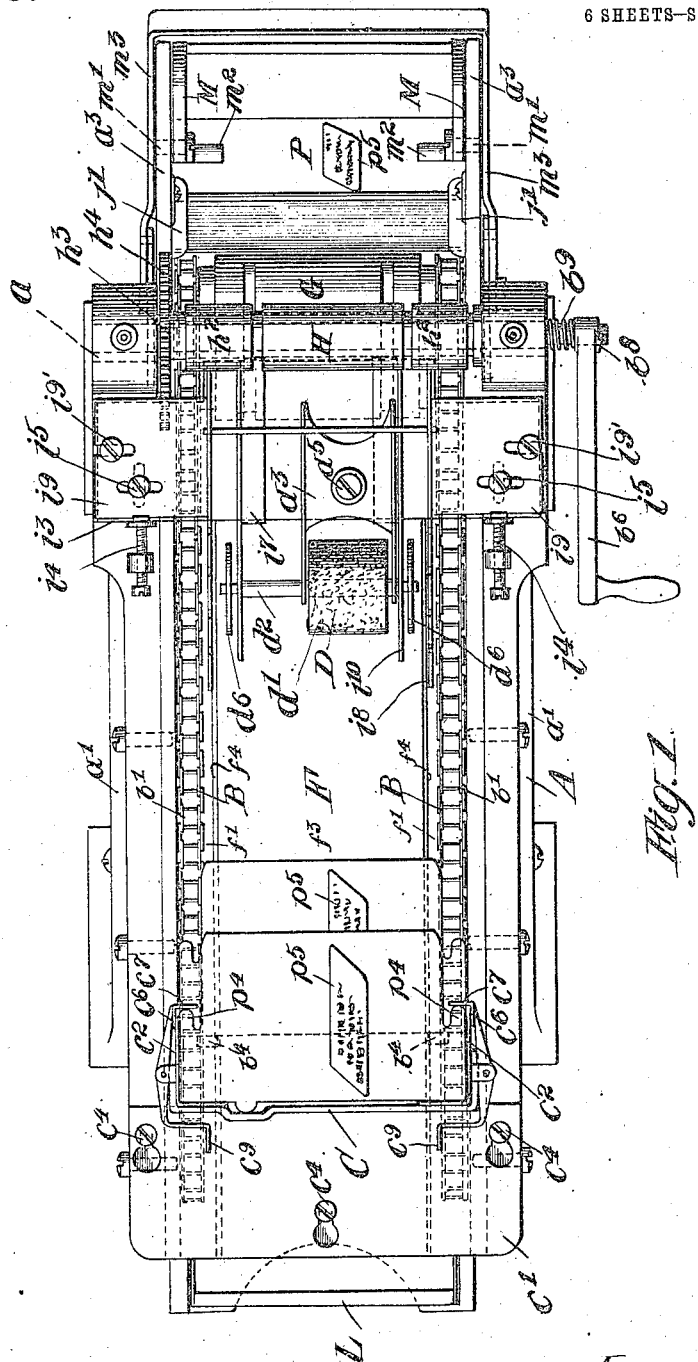

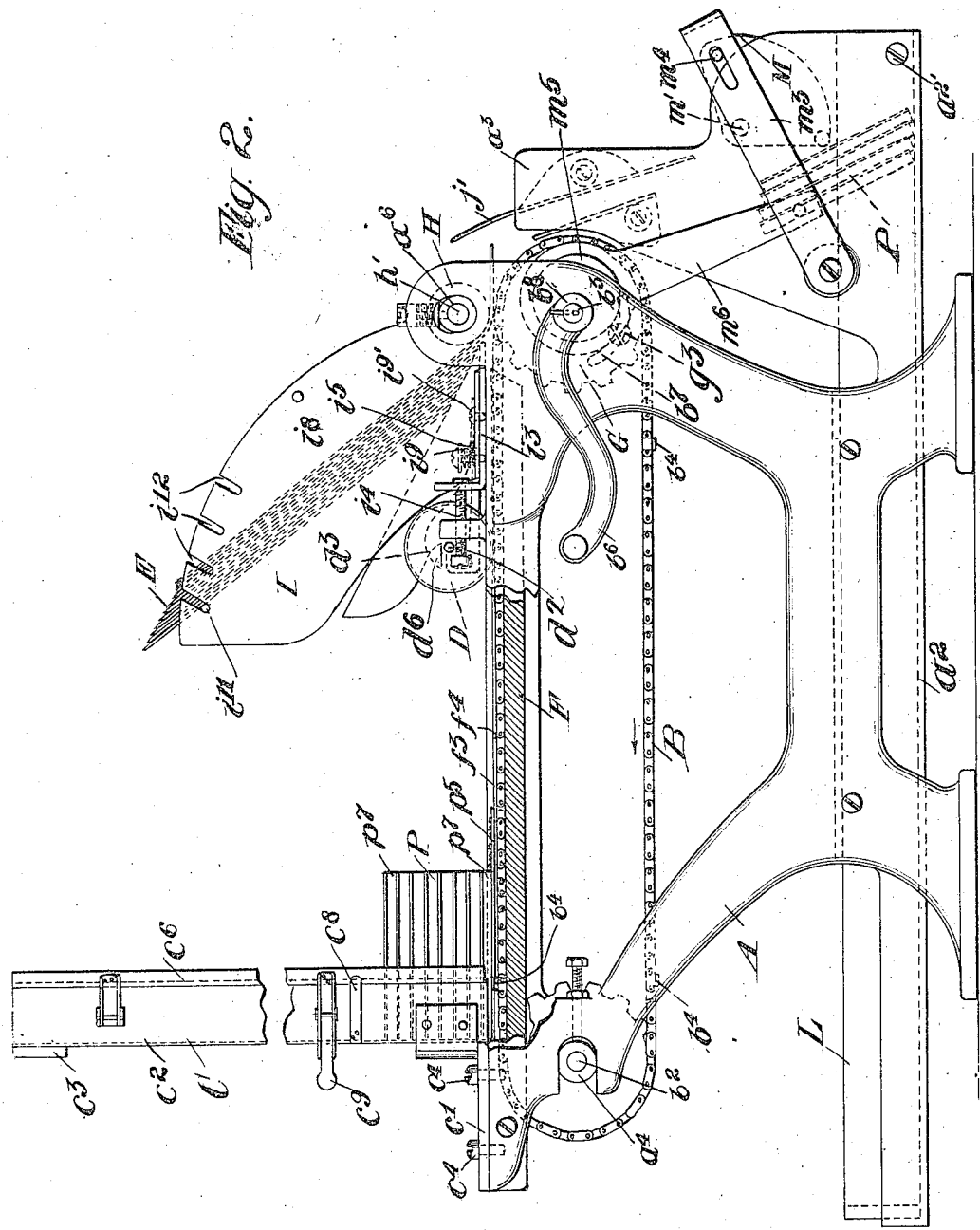

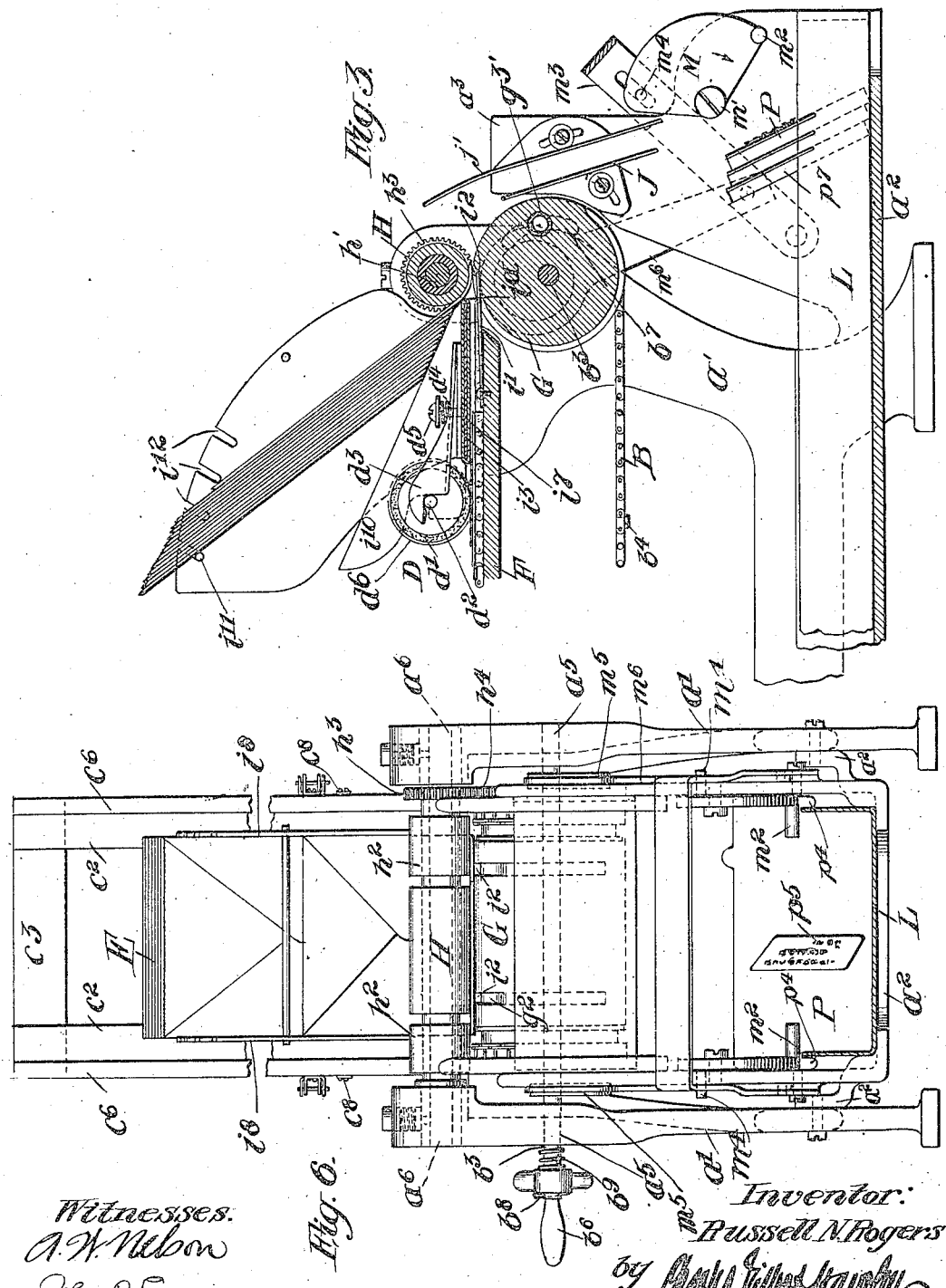

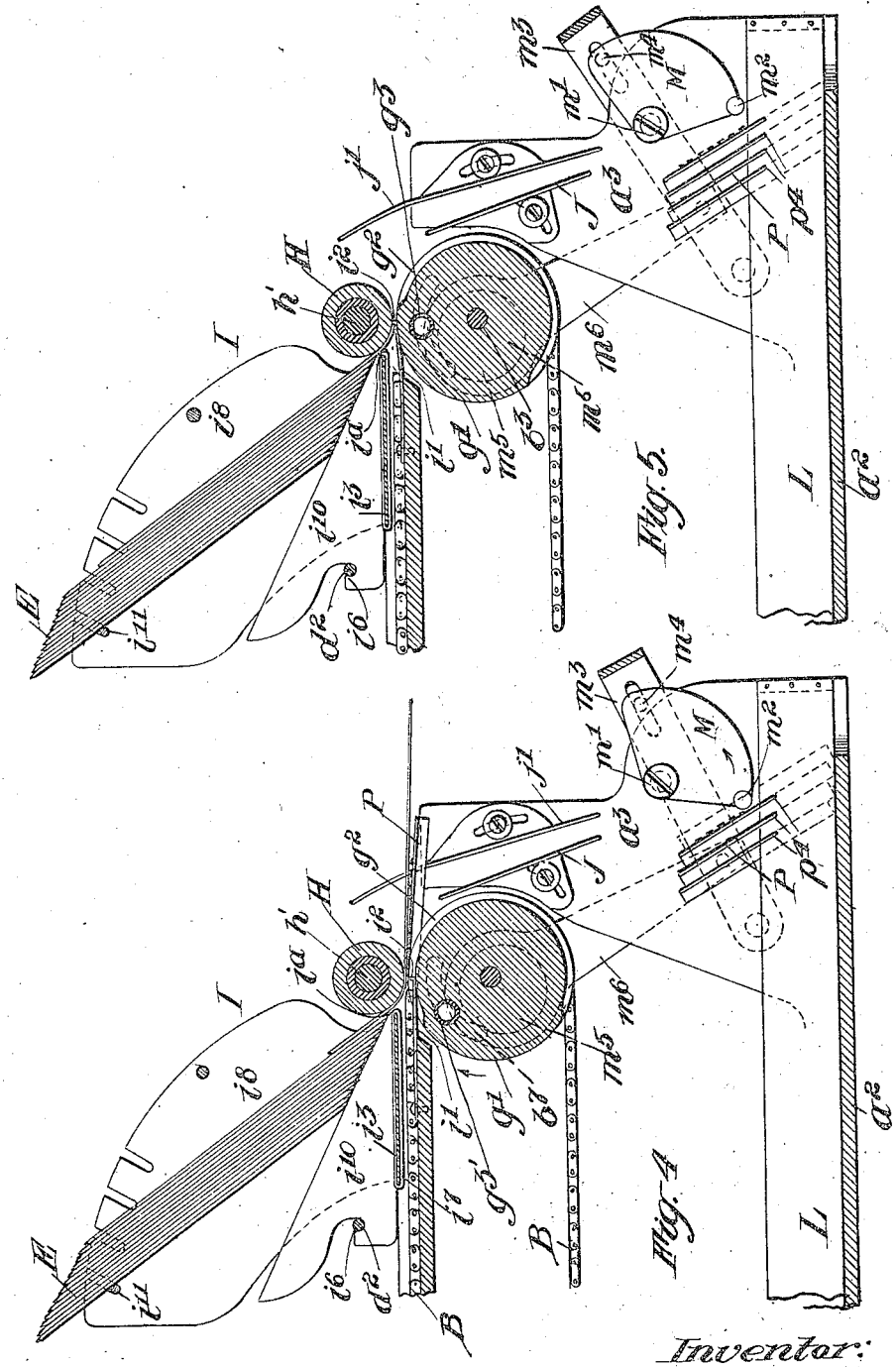

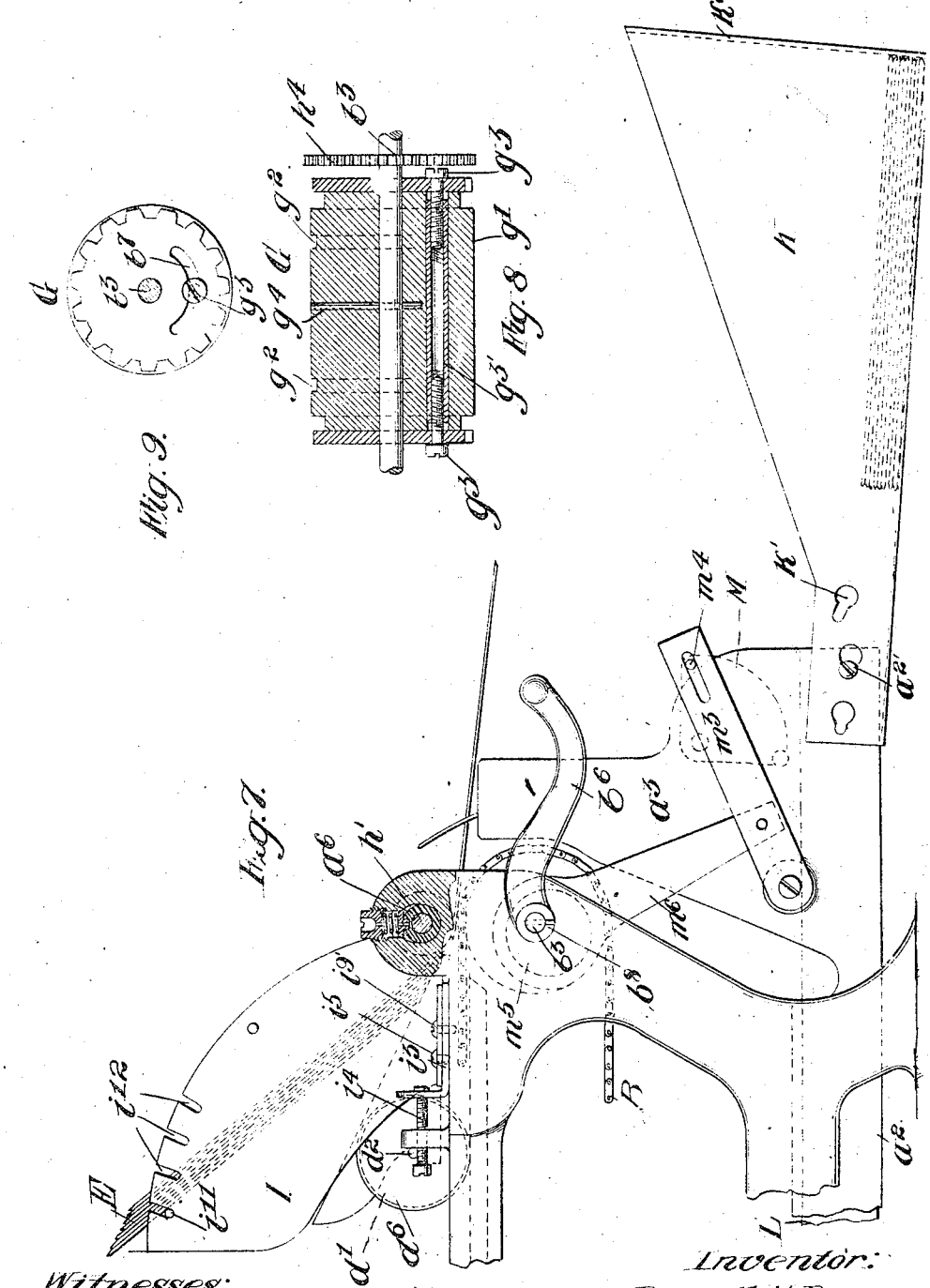

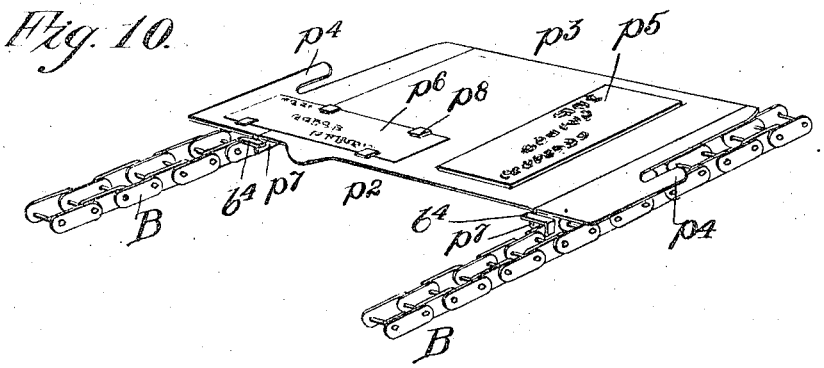
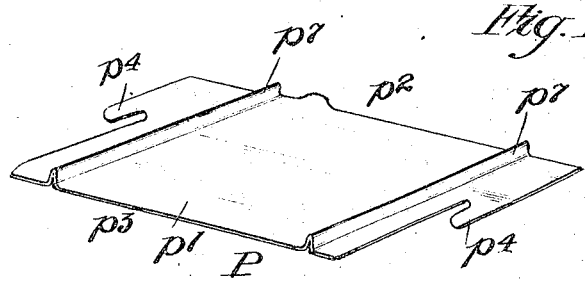
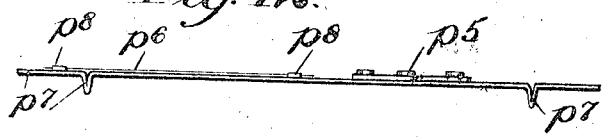

RUSSELL N. ROGERS, OF CHICAGO, ILLINOIS, ASSIGNOR, BY MESNE ASSIGNMENTS, TO ADDRESSOGRAPH COMPANY, OF CHICAGO, ILLINOIS, A CORPORATION OF ILLINOIS.

ADDRESSING-MACHINE.

1,125,180.  Specification of Letters Patent.  Patented Jan. 19, 1915.

Application filed December 13, 1907. Serial No. 406,252.

*To all whom it may concern:*

Be it known that I, RUSSELL N. ROGERS, a citizen of the United States, and resident of Chicago, Cook county, Illinois, have invented certain new and useful Improvements in Addressing-Machines, of which the following is a full, true, and clear description, such as will enable others skilled in the art to which it appertains to make and use the same.

The invention relates to improvements in addressing machines and has special reference to machines of that class in which address carriers or type plates are employed and are used repeatedly with different lots of envelops, bill-heads, cards or sheets.

The object of the invention is to provide an improved addressing machine of simple construction, of low cost, and which even an unskilled person may successfully operate.

Further and particular objects of the invention are to provide a machine of the class mentioned which shall be of small size; which shall be durable; which shall require very little power for its operation; which shall be rapid in action; and, which shall perform its work neatly and accurately.

Further specific objects of the invention are to provide a machine which shall be adapted to hold a stack of type-plates in readiness for use; which shall remove the plates from the stack one at a time; which shall ink the successive plates; which shall automatically feed an envelop or the like upon each type-plate at the proper time; which shall discharge and separate the plates and the envelops automatically; which shall stack the addressed envelops; which shall be provided with a plate drawer, or receptacle, into which the used plates shall be discharged; which shall be provided with means for closely and regularly packing the plates in said drawer or receptacle; and finally, one in which the drawer and the plate-holder shall be constructed to work together in such manner as to facilitate the emptying of the plates from the drawer into the holder or magazine.

An addressing machine embodying the invention, and wherein the foregoing objects are attained, will be more readily understood by reference to the accompanying drawings, forming a part of this specification and in which—

Figure 1 is a plan view of the addressing machine; Fig. 2 is a side elevation of the machine with a portion of its upper part or bed broken away to show the manner in which the type-plates leave the stack-holder or magazine and approach the inking device; Fig. 3 is a vertical section of the mechanism at the front end of the machine; Figs. 4 and 5 are like sections showing the positions of the parts at other instants; Fig. 6 is a front end elevation; the end of the plate drawer being broken away to better disclose the type plate packer; Fig. 7 illustrates the envelop stacking device; Fig. 8 is a sectional view of the lower printing roll; Fig. 9 is an end view thereof; and Figs. 10, 11 and 12 are front, back and edge views of one of the type plates.

The invention is capable of embodiment in many different forms and its essential elementary mechanisms and parts, while co-dependent in the machine herein illustrated, are capable of employment alone or in conjunction with less than the whole number of said elements; and, as will be understood from the following, the invention is not confined to the certain or specific constructions illustrated in the drawings, as both the construction and arrangement of the elements and parts thereof may be readily modified by one skilled in the art, without departing from the spirit of the invention. As here illustrated, the invention is in the form of a small, compact machine, adapted to be placed upon a table or desk and to be operated by a person standing or sitting beside it.

A thorough understanding of the invention will be facilitated by brief mention and description of the principal elements and elementary mechanisms composing the machine herein shown.

An endless conveyer, B, preferably occupying a horizontal plane, is arranged in a light frame, A, and means (preferably a crank) are employed for rotating the conveyer. Above the rear end of the conveyer is a holder, C, to receive a stack of type plates, P. In front of the holder is an inking device, D. The conveyer, B, is provided with lugs or pins which engage the bottom plate, P, in the holder. The plates are thereby successively extracted from the holder, C, and the type are inked as the plates pass beneath the inking device, D. Associated with the upper part of the conveyer is a light bed or plate, F, having grooves for the belts. The printing mechanism which coöperates with successive type-plates, to impress the addresses upon envelops, E, which are suitably fed thereto, is arranged at the forward end of the conveyer and preferably comprises two simple rolls, G and H, between which the plates, P, and envelops, E, pass. The larger (G) of the printing or pressure rolls is preferably mounted on the shaft at the forward end of the conveyer, B, and the other roller, H, is yieldingly held above it to afford the necessary pressure upon the type. An envelop receptacle or feeder, I, is arranged above the conveyer, B, near the upper printing roller, H, and by means of a simple mechanism operating automatically, the envelops, E, are permitted to pass between the rolls, G and H, one by one, in time to meet the type plates. An envelop stacking device, K, is arranged in front of the printing rolls to receive the envelops. The type-plate recovering or restacking device has for its chief element a drawer or slide, L, placed in the lower part of the frame, A, beneath the conveyer, B, in position to receive the type-plates as they fall away from the forward end of the conveyer. A packer, M, actuated from the conveyer shaft and operating above the forward end of the drawer, L, engages each plate as it drops into the drawer and moves it back to make room for the next plate. The equipment of the machine includes a number of these drawers filled with type-plates, and in operating the machine a stack of plates is first emptied from a drawer, L, into the holder, C, at the rear end of the machine. The empty drawer is then placed in the lower part of the machine in readiness to receive the same plates as fast as they are used. Thus the machine is completed and made ready for use. A number of envelops, E, are placed in the feeder, I, at the forward end of the machine. When the conveyer, B, is operated (by the crank shown) the type plates and the envelops are automatically fed between the printing rolls, G and H, the operation of the machine being completed by the stacking of the envelops in the tray, K, and the replacing or packing of the type-plates in the plate drawer, L. The refilled drawer is then removed from the machine and the operation is, or may be, repeated with the contents of another drawer.

Further referring to the drawings for details of construction it will be seen that the frame A comprises two side frames, $a^1$, which at the bottom are joined by the drawer support or shelf, $a^2$, and at the top are joined by the bed plate, F. The slideway or shelf, $a^2$, is preferably a metal casting and is provided with cheek pieces or side plates, $a^3$, which rise nearly to the top of the frame, at its forward end. The pieces, $a^3$, serve as guides for the type plates as hereinafter explained. The bed plate F contains grooves, $f^1$, in its edges, for the sprocket belts composing the conveyer, B. The middle portion, $f^3$, of the plate F, (see Figs. 1 and 2) is flat from end to end and supports the plates and the belts propel them thereon. The edges, $f^4$, of the bed plate serve as guides for the type-plates, P. The side frames, $a^1$, contain the adjustable bearings, $a^4$, and at the opposite end are provided with bearings, $a^5$ and $a^6$ for the shafts of the hereinafter described printing or pressure rolls, G and H.

The conveyer, B, comprises two endless chains or belts, $b^1$, $b^1$, together with sprocket wheels on the shafts, $b^2$, $b^3$, which latter are mounted in bearings, $a^4$ and $a^5$, respectively. At intervals the belts are equipped with lugs, $b^4$, extending from the sides of the belt links, for extracting type-plates, P, from the plate holder or magazine, C. A crank, $b^5$, is arranged on the shaft, $b^3$, when the machine is to be operated by hand, and when power is available the crank is replaced by a belt wheel or the like.

As well shown in Figs. 10, 11, and 12, each type plate comprises a thin sheet metal plate, $p^1$, having on its back two relatively deep ribs, $p^7$. As shown on Fig. 2, the plates, when stacked, present their ribs downwardly, one resting on the other, and the ribs of one holding it off the type, $p^5$, of the other. The rear, or upper edge, $p^3$, of the plate is longer than the lower edge $p^5$, and arms, or ears, $p^2$, are formed on the ends of the plate.

$P^6$ is a card attached to the plate by struck up lugs, $P^8$, and bearing the address which is reversely set in the type, $p^5$. The lines of type extend transversely on the plate in order that they may occupy a longitudinal position in the machine and upon the envelop, when printed.

The lowermost plate in the holder, C, rests upon the supporting surface, $f^3$, of bed F. When the rear ends of the type plate ribs, $p^7$, are engaged by two of the conveyer lugs, $b^4$, the plate is pushed forward, beneath the other plates, and passing under the inking device, D, is later presented between the rolls G and H, from which it is finally discharged into the drawer, L. The latter is of the width of the lower part of the plate, and hence, the ears of each plate hook over the longitudinal edges of the drawer, and thus the plates are supported in slightly inclined position therein as shown.

The plate holder or magazine C comprises a block, $c^1$, and standards, $c^2$, $c^2$, which rise therefrom and are connected at the top by a cross brace, $c^3$. The block, $c^1$, rests on the top of the frame and is detachably secured thereto by three set screws, $c^4$, the block, $c^1$, having corresponding key holes to facilitate the detachment of the magazine. On each standard, $c^2$, is hinged a supplementary section, $c^6$, having an inwardly turned flange, $c^7$, to engage the ends of the ears, $p^4$, on the plates, P, as best shown in Figs. 1 and 2. The hinged parts, $c^6$, are held in position by springs, $c^8$, in the hinges, and may be simultaneously opened by grasping the short levers, $c^9$, thereon. When opened they permit the plates to be placed in the holder from the front side thereof. The lower ends of the flanges, $c^7$, of hinged sections, $c^6$, are cut away to allow the bottom plate to leave the holder, (see Fig. 2), that is, they stand above the level of the surface, $f^3$. In leaving the holder the plates are guided by the engagement of their ribs, $p^7$, with the edges, $f^4$, of the portion, $f^2$.

The printing mechanism proper, wherein the type are pressed against the envelops, sheets, or cards, comprises the two rolls, G and H. The roll G is on the same shaft, ($b^3$) as the sprocket wheels of the conveyer. The shaft, $b^3$, is adapted to rotate in its bearings, $a^5$, but is otherwise held against movement. The shaft $h'$, on the other hand, is yieldingly held by means of spring pressed bearings or boxes, $a^6$. These boxes also move up and down in the elongated openings in the frame and rise therein when an envelop and a plate pass between the rolls. At other times the boxes, $a^6$, rest upon the bottoms of the openings. The roll G is preferably made of incompressible material while the roll H is made of soft composition, like a printer's roll. The short roll parts, $h^2$, on the shaft, $h^1$, are of less pliable rubber and coact with the roll H in the envelop feeding operation. For convenience, the roll sections H and $h^2$ are placed or formed on a sleeve which in turn is fixed on the shaft, $h^1$. The shafts, $h^1$ and $b^3$, are connected by gears, $h^3$ and $h^4$. These gears are proportioned to each other in the same ratio as the peripheries of the rolls so that the peripheral speeds of the rolls G and H are the same. The roll G is also provided with parts which assist in feeding the envelops, to-wit, the cam surfaces, $g^1$, and grooves, $g^2$.

The envelop-feeding mechanism comprises the parts above mentioned together with an envelop holder or tray, and so-called restraining devices and stop-fingers, $i^1$, which latter are operated by cams on the roll G. The fingers, $i^1$, are provided with upwardly turned or hooked ends, $i^2$, and are fastened upon the forward end of the bed plate F. The space between the rolls G and H is sufficient to permit the finger ends, $i^2$, to rise upon the cam surfaces, $g^1$, without interfering with the rotation of the roll, H. When in the grooves, $g^2$, the finger ends are below the surface of the roll G, and permit the type-plates to pass freely. The plate, $i^3$, rests upon the frames, $a^1$, and extends across the conveyer, above the path of the plates. This plate is adjustable by means of the jack screws, $i^4$, and is fastened by other screws, $i^5$. Obviously the forward edge of the plate, $i^3$, is presented to the intake side of the roll, H, and may be adjusted back and forth with relation thereto. Before the other parts are placed thereon two wide rubber bands, $i^7$, are put on the plate. These bands turn about the forward edge of the plate, $i^3$, and projecting slightly therefrom constitute the restraining devices before referred to. The rubber ends of the restraining devices are indicated as, $i^a$. They operate to hold back the second or next to the front envelop in the holder.

The bottom of the envelop holder is formed by two inclined bottom strips, $i^{10}$, which are fastened upon the adjustable plate, $i^3$, which bears the rubber bands or other restraining device, $i^a$. The rear ends of the inclined plate, $i^{10}$, contain bearings or notches, $i^0$, which receive the shaft of the inking roll. The sides of the envelop holder are formed by the two plates, $i^8$, which have foot pieces, $i^9$, containing slots and secured to the plate, $i^3$, by set screws, $i^{9'}$, which permit the sides, $i^8$, of the envelop holder to be adjusted toward and from each other as required to fit envelops of different widths. A rod, $i^{11}$, extending through the sides, and adjustable in different notches, $i^{12}$, thereof, serves to hold the loose pack of envelops, E, at the proper inclination. The envelops are placed on edge on the inclined strips, $i^{10}$, and of their own weight sink to the lower ends thereof, thereby pressing the first envelop against the intake side of roll H.

The operation of the envelop feeding mechanism is as follows: The roll, H, being rotated draws down the first envelop, and through the medium thereof presses the second envelop firmly upon the restraining devices, $i^a$. It is assisted in this by the fact that the parts, $i^a$, are adjacent the soft roll, H, which yields to the envelops while the less pliable ends, $h^2$, tend to hold back the corners of the envelop and thus hold them back upon the inclined strips or ways, $i^{10}$. When the first envelop is drawn down, it is caught by the fingers, $i^1$, which are then elevated as shown in Fig. 5. Rotation of the roll G, causes the fingers to drop into the grooves, $g^2$, (as shown in Fig. 3), thereby releasing the envelop, slightly in advance of the arrival of the type-plate. From that time on, the envelop and the plate pass between the rolls as represented in Fig. 4, imprinting the address on the envelop and discharging both the envelop and the plate. When the upper end of the first envelop passes below the lower end of the second envelop, the latter instantly drops between the restraining devices and the roll, H, and is carried down until stopped by the fingers, $i^1$, which by that time have returned to their raised position. The roll G is fastened to the shaft, $b^3$, as by a set screw or pin, $g^2$. (See Fig. 8.) By timing the operation of the fingers, $i^1$, with relation to the lugs upon the conveyer belt the machine may be adapted to the addressing of envelops of different lengths, it being obvious that by hastening or delaying the drop of the fingers, the envelops may be caused to start between the rolls either at a less distance or a greater distance ahead of the incoming type-plate. In this manner it is possible to adjust the machine to place the imprint upon the envelop at any desired position thereon. The position of the cam grooves in the roll, G, with reference to the conveyer belts determines the operation of the fingers, $i^1$, and the desired adjustability is secured by moving the roll with respect to the conveyer sprocket wheels on the shaft, $b^3$. To this end curved slots, $b^7$, are provided in the sprocket wheels and set screws, $g^3$, pass through these into the roll, G. A metal tube, $g^{3\prime}$, is preferably arranged in the roll to receive the screws. By loosening one of the screws both sprocket wheels may be released from the roll, G, and thereupon the roll may be turned with relation to the sprocket wheels to properly "time" the rise and fall of the fingers, $i^1$. It will be noted that the metal tube, $g^{3\prime}$, is shorter than the roll and that when the screw, $g^3$, is tightened, the sprockets are pressed against the ends of the roll and thus fastened to the same and to the shaft, $b^3$. In this connection attention is called to the fact that the roll, G, cannot be turned backwardly, a ratchet clutch $b^8$ being arranged between the crank, $b^9$, and the shaft, $b^3$. The spring, $b^9$, tends to keep the shaft and crank in engagement.

The inking device, D, comprises an inking roller, $d^1$, the shaft, $d^2$, of which is held in the bearings, $i^6$, in the envelop holder. Disks, $d^6$, on the ends of the shaft, $d^2$, hold the roll out of contact with the bed plate, F. On the other hand the space is too slight to permit the passage of a plate without raising the roll. To permit the roll to rise and at the same time press upon the type, a spring yoke, $d^3$, is used. This yoke rests upon the shaft at the ends of the roll and is pressed down by a spring, $d^4$. Its pressure is adjusted by means of a screw, $d^5$. The roll moves freely when struck by a passing plate and rolling upon the type inks the same uniformly.

The envelop stacking or receiving device, K, is in the form of a tray open at the top to receive an envelop from the printing mechanism. The rear end of the tray is hooked or otherwise attached to the part, $a^2$, as by pins, $a^{2\prime}$, thereon. The adjustment of the tray for envelops of different lengths is permitted by the several holes, $k^1$, therein, (see Fig. 7). The envelops are forcibly ejected by the printing rolls but strike the high end, $k^2$, of the tray and fall into the bottom thereof.

As before stated the plate drawer having been emptied is placed in the lower part of the machine, in position to again receive the plates. Each plate when ejected by the rolls falls upon the cross plate, J, extending between the cheeks, $a^3$, $a^3$. The outer guides, $j^1$, provided on the inner sides of the cheeks, $a^3$, intercept the lugs or ears on the plates and prevent the plates from being thrown too far forward. They therefore drop directly down into the forward end of the plate drawer, L. Fig. 4 shows a plate about to leave the rolls; at the instant before it drops between the parts J and $j'$.

The repacking mechanism by which successive plates are pushed backward in the drawer comprises the mechanism, M. The principal members of this mechanism are the bell cranks, M, journaled on studs, $m^1$, projecting from the cheeks, $a^3$, and each provided with a pin or arm, $m^2$, adapted to engage the plates, the instant after each falls into the drawer. The bell cranks are operated by the yoke or lever, $m^3$, pivoted as shown, and having slot and pin connections, $m^4$, with the bell cranks, M. The lever, $m^3$, is operated from eccentrics, $m^5$, on the shaft, $b^3$, being connected therewith by the rods, $m^6$. The operation of the packer is as follows: The rearward or packing movement of the bell crank studs, $m^2$, is completed at about the time that the plate begins to pass through the printing rolls and the studs then begin their return stroke, in the direction indicated in Fig. 4, leaving space in the front of the drawer to receive the plate by the time it falls, as indicated in Fig. 5. The packer continues the movement for a space of time and then returns toward the plates and engaging the plate last to enter the drawer forces it and all of the other plates backwardly therein. The plates hang upon the upper edges of the drawer and also rest upon the bottom of the drawer. In this position they slide freely and oppose very little resistance to the action of the packer. The shelf, $a^2$, is open at both ends and the drawer may be withdrawn from either end of the machine; but in case it is desired to draw it out from the front end, the packer is first moved to its highest position, approximately as shown in Fig. 3.

As a general statement of the operation of the machine precedes the foregoing detailed description and as the operations of the several parts and component mechanism have been described in connection with the explanation of their form and arrangement, it is deemed unnecessary to further summarize or define the use and operation of the machine.

Having thus described my invention, I claim as new and desire to secure by Letters Patent:

1. An addressing machine bed plate having a central plate supporting section, a magazine rising therefrom, and adapted to hold a stack of type plates each having two longitudinally disposed, parallel ribs depending from the under side thereof arranged to engage the side of the plate supporting section, and a conveyer for removing one plate at a time from said magazine and along said bed.

2. In an addressing machine, a printing mechanism, in combination with a type-plate feeder, an inclined chute at the discharge side of said mechanism, having adjustable coacting upper and lower inclined guides for arresting each plate and causing it to assume an upright position, and a type drawer to receive the plates from said chute, substantially as described.

3. In an addressing machine, a frame in combination with an endless belt conveyer arranged for rotation therein, a printing mechanism at one end of said conveyer and a type plate magazine at the other end of said conveyer, said magazine comprising uprights rigidly supported by said frame and comprising suitably connected angle bars, other angle bars hinged at the forward edges of the first mentioned angle bars, springs pressing them together and hand levers for opening them substantially as described.

4. In an addressing machine, a frame including a bed plate having a flat top and provided with grooves at its edges, chain belts operating in said grooves, lugs projecting inwardly from the sides of said belts and below the top of said bed plate, a type plate magazine having its bottom formed by said bed plate and suitable inking and printing means, substantially as described.

5. In an addressing machine, a bed plate provided with parallel grooves to receive the ribs of type plates, conveyer belts operating in said grooves and having inwardly extending lugs to engage the type plate ribs, a type plate magazine and suitable printing means, substantially as described.

6. In an addressing machine, a bed plate having a flat upper surface, in combination with conveyer belts, a type plate magazine, an inking roll shaft, an inking roll thereon, carrying disks normally resting upon said bed plate, a spring pressed yoke bearing on said shaft and a printing mechanism, substantially as described.

7. In an addressing machine, a frame in combination with a type plate feeder, printing rolls and their respective shafts to receive plates therefrom, vertically movable spring pressed bearings wherein the shaft of the upper roll is held, an envelop timing means between said rolls, one of said rolls being relatively rotatable to adjust said timing means.

8. In an addressing machine, a frame in combination with an endless belt conveyer having lugs to engage type plates, the sprocket wheels of said conveyer, a shaft whereon said sprocket wheels are mounted, a roll arranged between said sprocket wheels and fixed upon said shaft, a member arranged in said roll and of less length, curved slots in said sprocket wheels, screws extending through the same into the ends of said member for securing the sprocket wheels to said roll, a coacting roll above the first mentioned roll, an envelop holder adjacent thereto, stop fingers arranged between said rolls and said lower roll having cams for operating said fingers, substantially as described.

9. In an addressing machine, a frame in combination with a type plate feeder and printing mechanism carried by said frame, depending packer cranks carried by said frame, a mechanism for simultaneously actuating said cranks to force the type plates rearwardly as they are discharged from said printing mechanism, and a drawer mounted in said frame for receiving said plates, said drawer being disposed between said cranks and freely removable from said frame without disturbing said cranks and actuating mechanism.

10. In an addressing machine, a fixed drawer support and a drawer removably held thereby, in combination with a type plate chute above the same, bell cranks mounted on said support for operation at the sides of and above the drawer, and adapted to engage the ends of the type plates, a yoke for actuating said bell cranks simultaneously and means for operating said yoke, substantially as described.

11. In an addressing machine, a frame in combination with a type plate holder mounted on the rear end of said frame, a type plate feeding mechanism mounted in said frame, a printing mechanism mounted in the forward end of said frame and co-acting with said feeding mechanism, a plate receiver arranged below said feeding mechanism and printing mechanism, oscillating packer cranks beneath said printing mechanism at the forward side thereof and above the respective sides of said plate receiver, and means for periodically causing said cranks to engage the ends of successive plates in said receiver.

12. In an addressing machine, a frame, in combination with a type-plate holder thereon, a type-plate feeder, a printing mechanism mounted in said frame, one member of said printing mechanism being located above said feeder, and comprising a roll, an envelop holder having a rubber shod metal edge substantially parallel with and adjacent to the intake side of said roll, rubber shod rolls concentric with said roll and adjacent to the rubber upon the metal edge of said envelop holder, substantially as described.

13. In an addressing machine, a frame, in combination with a type-plate holder thereon, a type-plate feeder, a printing mechanism mounted in said frame, one member of said printing mechanism being located above said feeder, and comprising a horizontal rotating roll of soft composition, an envelop holder having a rubber shod metal edge, substantially parallel with and adjacent to the downwardly moving side of said roll, and rubber shod rolls concentric with said roll and adjacent to the rubber upon the metal edge of said envelop holder, the rubber upon said rolls being less pliable than the soft composition roll, substantially as described.

In testimony whereof, I have hereunto set my hand, this 26th day of November, 1907, in the presence of two subscribing witnesses.

RUSSELL N. ROGERS.

Witnesses:
CHARLES GILBERT HAWLEY,
JOHN R. LEFEVRE.